United States Patent
Hamamura et al.

(10) Patent No.: US 6,689,481 B2
(45) Date of Patent: Feb. 10, 2004

(54) ALUMINUM ALLOY HEAT EXCHANGER RESISTIVE TO TOBACCO ODOR IMPREGNATION

(75) Inventors: Kazunari Hamamura, Chuo-ku (JP); Kengo Kobayashi, Nagoya (JP); Hiroyoshi Sugawara, Anjo (JP); Osamu Kasebe, Okazaki (JP); Kazuhisa Uchiyama, Nagoya (JP)

(73) Assignees: Nihon Parkerizing Co., Ltd., Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 10/010,654

(22) Filed: Nov. 7, 2001

(65) Prior Publication Data

US 2002/0090523 A1 Jul. 11, 2002

(30) Foreign Application Priority Data

Nov. 10, 2000 (JP) ........................................ 2000-344173

(51) Int. Cl.[7] ............................ B32B 15/04; B32B 15/20
(52) U.S. Cl. ......................... 428/457; 428/458; 428/459; 165/133
(58) Field of Search ................... 428/457, 532, 428/459, 428; 165/133, 134.1

(56) References Cited

U.S. PATENT DOCUMENTS

| | | | |
|---|---|---|---|
| 4,528,283 A | 7/1985 | Lang et al. .................... 514/55 |
| 5,418,302 A | * 5/1995 | Shimizu et al. ................ 526/62 |
| 5,813,452 A | * 9/1998 | Haruta et al. ............. 427/388.2 |
| 6,508,958 B1 | * 1/2003 | Wojcik ..................... 427/288.2 |

FOREIGN PATENT DOCUMENTS

| | | |
|---|---|---|
| DE | 196 04 706 | 8/1997 |
| EP | 0 911 427 | 4/1999 |
| JP | 59-186557 A | * 10/1984 |
| JP | A-1-270977 | 10/1989 |
| JP | A-1-299877 | 12/1989 |
| JP | A-2-258874 | 10/1990 |
| JP | A-6-306247 | 11/1994 |
| JP | A-7-190676 | 7/1995 |
| JP | A-8-296992 | 11/1996 |
| JP | A11-293149 | 10/1999 |

* cited by examiner

Primary Examiner—Monique R. Jackson
(74) Attorney, Agent, or Firm—Harness, Dickey & Pierce, PLC

(57) ABSTRACT

An aluminum alloy heat exchanger resistive to impregnation of tobacco odor includes a base body of an aluminum alloy heat exchanger and an organic hydrophilic coating layer formed on the surface of the heat exchanger base body, and including a component (A) containing a chitosan compound selected from chitosan and derivatives thereof, and a component (B) containing a carboxylic compound having two or more carboxyl groups per molecule thereof, in a total solid amount of the components (A) and (B) of 20% by mass or more, based on the total amount by mass of the organic hydrophilic coating layer.

3 Claims, 1 Drawing Sheet

ALUMINUM ALLOY HEAT EXCHANGER RESISTIVE TO TOBACCO ODOR IMPREGNATION

TECHNICAL FIELD

The present invention relates to an aluminum alloy heat exchanger resistive to tobacco odor impregnation. In particular, the present invention relates to an aluminum alloy heat exchanger with a coating having a reduced absorption of odorous components of tobacco, etc.

BACKGROUND ART

When an aluminum alloy heat exchanger usable as an air conditioner for a motor car is operated, condensed water adheres to the surfaces of fins. When the fin surfaces have a low wetting property, the condensed water forms water droplets substantially in the form of semispheres on the fin surfaces, or water bridges are formed between the fin surfaces. The semispheric water drops and the water bridges form resistance to airflow and other problems, for example, a reduction in heat exchange efficiency and generation of noise. In the prior art for solving the above-mentioned disadvantages, an organic hydrophilic coating is usually formed on the surface of the heat exchanger. For example, Japanese Unexamined Patent Publication No. 1-299,877 discloses a coating formed from a combination of polyvinyl alcohol with a specific water-soluble polymer and a cross-linking agent, Japanese Unexamined Patent Publication No. 1-270,977 discloses use of polyacrylamide resins, Japanese Unexamined Patent Publication No. 6-306,247 discloses copolymerization of specific hydrophilic monomers, and Japanese Patent Publication No. 2520308 discloses use of organic hydrophilic treating agents comprising carboxymethylcellulose polymers, N-methylolacrylamide, polyacrylic acid and zirconium compound.

It is also known that odorous components contained in the ambient atmospheric air or air contained in the heat exchanger are absorbed by the condensed water adhered to the surface of the heat exchanger and are gradually accumulated on the heat exchanger surface over time, and then the odorous components are released from the heat exchanger surface during operation of the air conditioner, and giving off an offensive odor.

As a method for deodorizing the heat exchanger, it is well known to employ activated carbon. In this method, the activated carbon is shaped into pellets or a honeycomb, and the odorous components in air are absorbed in fine pores formed in the surface portions of the shaped activated carbon by diffusion or circulation or ventilation of the odorous component-carrying air through the heat exchanger.

In other deodorizing methods not using the absorption procedure, the absorbing material is reactivated by an electric heating procedure. In this method, an absorbing material and a noble metal oxide catalyst are carried on a surface of a heating resistor, while the absorbing material has a satisfactory absorbing activity, the absorbing material is used for deodorizing purposes at room temperature, and when the absorbing activity of the absorbing material becomes insufficient, the heating resistor is electrically activated to heat the absorbing material to a temperature of 300° C. or more, and to oxidatively decompose the odorous components absorbed in the absorbing material, and to reactivate the absorbing material.

Also, as a technology for activating a heat exchanger surface, Japanese Unexamined Patent Publication No. 8-296,992 discloses a heat exchanger utilizing a photocatalyst. In this heat exchanger, a mixture of a photocatalyst with a binder is coated on the surfaces of heat exchanging aluminum fins, an ultraviolet ray lamp is arranged so that ultraviolet rays can be irradiated toward the heat exchanger. When the photocatalyst-containing coatins are irradiated by the ultraviolet rays, the adhesion and accumulation of the odorous components on the heat exchanger surface can be reduced.

Among the above-mentioned deodorizing methods, the methods using the absorption activity have the following problems. When activated carbon is used, the deodorizing activity of the activated carbon decreases with an increase in the amount of the absorbed odorous components, with the activated carbon finally being saturated by the absorbed odorous components and ceasing to have deodorizing activity. Sometimes, activated carbon saturated by the odorous component itself becomes a source of generation of the offensive odor. Also, when the deodorizing material is placed in an air conditioner for practice, the space velocity is too high, and thus the time of contact of the odorous component-containing gas with the deodorizing material is insufficient, the degree of deodorization of the deodorizing material per pass of the odorous component-containing gas is low, and thus the resultant deodorization effect is insufficient. To improve the above-mentioned method, it is necessary to decrease the space velocity and to increase the deodorizing activity. However, to satisfy this requirement, the absorbing material and a certain carrier for the absorbing material must be formed into a large-scale honeycomb, and this causes the cost of the absorbing material to increase.

In the deodorizing method in which the absorbing material is reactivated by electrical heating, replacement of the absorbing material is not necessary. However, for the purpose of reactivation, the absorbing material must be heated to a temperature of about 300° C. or more, which may cause the absorbing material to be unnecessarily heated to a high temperature and the environs of the absorbing material to become dangerous.

When the photocatalyst as disclosed in Japanese Unexamined Patent Publication No. 8-296,992 is employed, the necessary ultraviolet ray lamps cause the method cost to increase, and a new problem in that intermediate decomposition products of the odorous components produced in the presence of the photocatalyst may be a source of offensive odor.

DISCLOSURE OF THE INVENTION

An object of the present invention is to provide an aluminum alloy heat exchanger resistive to impregnation of tobacco odor or other odorous components, to solve the above-mentioned problems of the prior art.

The inventors of the present invention conducted extensive research in order to find solutions for the above-mentioned problems, and as a result, found that the amount of an odorous component such as tobacco odor absorbed in the surface of a heat exchanger can be significantly reduced by coating the surface of the heat exchanger with a coating layer comprising (A) at least are organic compound selected from chitosan and derivatives thereof and (B) at least one organic compound having at least two carboxyl groups per molecule of the compound, the total solid amount (A)+(B) of the organic compound component (A) and the organic component (B) being 20% by mass, based on the total amount by mass of the coating layer.

In the aluminum alloy heat-exchanger of the present invention, which is resistive to impregnation of tobacco odor, the chitosan derivatives are preferably selected from glycerylated chitosan.

In addition, the carboxylic compound is preferably selected from oxalic acid, malonic acid, maleic acid, fumaric acid, succinic acid, malic acid, tartaric acid, citric acid, phthalic acids, itaconic acid, mellitic acid, trimellitic acid, trimesic acid, pyromellitic acid, naphthalenetetracarboxylic acid, propanedicarboxylic acid, butanedicarboxylic acid, pentanedicarboxylic acid, hexanedicarboxylic acid, heptanedicarboxylic acid, butanetricarboxylic acid, butanetetracarboxylic acid, cyclohexanetetracarboxylic acid, hexanetricarboxylic acid, acrylic acid polymers, methacrylic acid polymers and acrylic acid-methacrylic acid copolymers.

Further, the component (A) and the component (B) are preferably present in a solid mass ratio (A)/(B) of 3:1 to 1:3.

BEST MODE OF CARRYING OUT THE INVENTION

Figure 1:
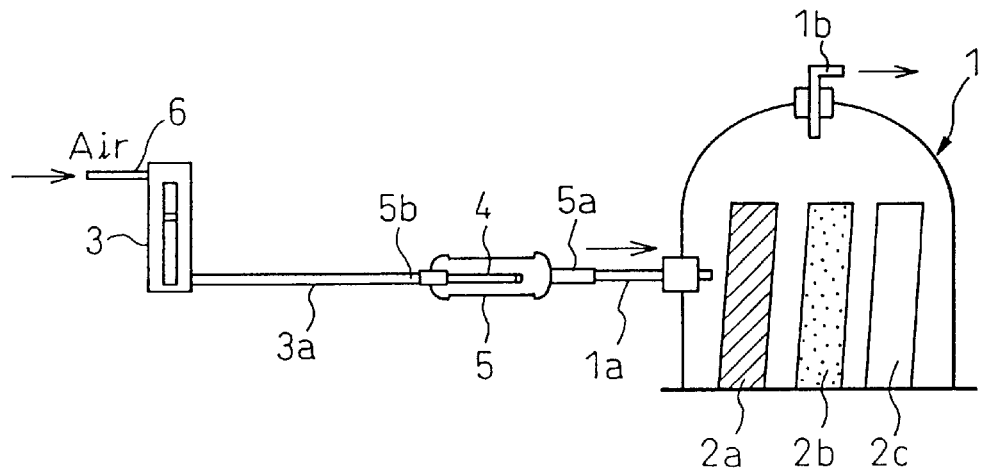
FIG. 1 is an explanatory front view of a apparatus for testing an absorption of odorous components of tobacco by a coated fin of heat exchanger.

The aluminum alloy heat exchanger of the present invention comprises a base body made from an aluminum alloy usable for the heat exchanger, and an organic hydrophilic coating layer formed on at least a portion of the surface of the heat exchanger base body and comprising a component (A) comprising at least one chitosan compound selected from chitosan and derivatives thereof and a component (B) comprising at least one carboxylic compound having two or more carboxyl groups per molecule of the compound, the total solid amount of the components (A) and (B) being 20% by mass or more, based on the total mass amount of the organic hydrophilic coating layer. The aluminum alloy heat exchanger exhibit a significantly reduced absorption of odorous components of tobacco and other odorous materials.

The chitosan compound usable as the component (A) of the coating layer is selected from chitosan and derivatives thereof. Chitosan is produced by deacetylating chitin (β-1, 4-poly(N-acetyl-D-glucosamine)) which is a polysaccharide compound, namely β(1→4) bonded N-acetyl-β-D-glucosamine. The chitosan derivatives are preferably selected from glycerylated chitosans. The glycerylated chitosans preferably have a degree of glycerylation of 2:1 to 1:2. The glucerylated chitosans are preferably employed to assuredly impart high hydrophilicity to the coating layer.

The carboxylic compound for the component (B) must be reactive with the chitosan compound of the component (A) having amino groups or hydroxyl groups to cross-link the chitosan compound molecules therethrough and to provide a water resistant cross-linked molecular network structure in the coating layer.

The carboxylic compound for the component (B) must have two or more carboxylic groups and is preferably selected from, for example, oxalic acid, malonic acid, maleic acid, humaric acid, succinic acid, malic acid, tartaric acid, citric acid, phthalic acids, itaconic acid, mellitic acid, trimellitic acid, trimeric acid, pyromellitic acid, naphthalenetetracarboxylic acid, propanedicarboxylic acid, butanedicarboxylic acid, pentanedicarboxylic acid, hexanedicarboxylic acid, heptanedicarboxylic acid, butanetricarboxylic acid, butanetetracarboxylic acid, cyclohexanetetracarboxylic acid, hexanetricarboxylic acid, acrylic polymers, methacrylic acid polymers and acrylic acid-methacrylic acid copolymers. To assuredly impart a high hydrophilicity to the coating layer, citric acid which has polar groups in addition to the carboxyl group and mellitic acid having a large number of carboxyl groups are preferably employed.

In the heat exchanger of the present invention, the coating layer formed on at least a portion of the base body of the heat exchanger must have a total solid content of the components (A) and (B) of 20% by mass or more based on the total mass amount of the coating layer. If the total solid content ((A)+(B)) is less than 20% by mass, the reduction effect of the resultant coating layer on the absorption of the odorous components of tobacco and other odorous materials is unsatisfactory.

Also, with respect to the contents of the components (A) and (B) in the coating layer, preferably the ratio (A)/(B) in the content by mass of the component (A) to the component (B) is in the range of from 3:1 to 1:3. The ratio (A)/(B) in the range of from 3:1 to 1:3 is preferable to obtain the coating layer having a satisfactory water resistance.

Optionally, the organic hydrophilic coating layer further comprises a surfactant or a hydrophilic polymer to enhance the hydrophilicity of the coating layer, and/or an antibacterial agent and/or antifungus agent, to prevent proliferation of bacteria and fungi.

Also, optionally, for purpose of enhancing the reduction effect of the coating layer on the absorption or impregnation of odorous components of tobacco or other odorous materials, or of reducing the odor of the coating layer per se, a deodorizer can be contained in the coating layer, as long as the purpose of the present invention can be attained.

The method of forming the organic hydrophilicic coating layer on the surface of the base body of the heat exchanger will be explained below.

The surface of the base body of the heat exchanger is cleaned with a solvent-type cleaning agent or alkaline or acid type aqueous detergent. If the base body surface is clean, the cleaning procedure may be omitted. The clean surface of the base body of the heat exchanger is optionally ground-treated with a known chromate-treating agent, iron phosphate-coating liquid, zinc phosphate-treating liquid, titanium or zirconium-containing treating liquid or an organic coating liquid to enhance corrosion resistance and/or coating layer-adhesion of the base body surface. Then, the base body surface is coated with a coating liquid for forming the organic hydrophilic coating layer, by a spraying, dipping, roll-coating, or shower-coating method, and the coated coating liquid layer is dried to form the coating layer. The dry coating layer is preferably in an amount of 0.05 to 5 g/m$^2$, more preferably 0.1 to 2.0 g/m$^2$. If the amount of the coating layer is less than 0.05 g/m$^2$, the resultant coating layer exhibits an unsatisfactory reduction effect in odorous component-absorption or impregnation of tobacco or other odorous materials and insufficient hydrophilicity. If the coating layer amount is more than 5 g/m$^2$, it is difficult to uniformly form the coating layer.

EXAMPLES

The present invention will be further explained by the following examples.

In the examples and comparative examples, the following procedures were carried out.
(1) Cleaning and ground treatment of base material of heat exchanger An aluminum alloy base body for heat exchanger was immersed in an aqueous cleaning liquid containing 30 g/liter of an weak alkaline degreasing agent (trademark: Finecleaner 315, made by Nihon Parkerizing Co.) and kept at a temperature of 60° C. for 90 seconds, to remove stains on the base body surface, and rinsed with city water for 30 minutes. Then the surface-cleaned base body was immersed in a chromate treating liquid containing 72 g/liter of chromic acid-chromating agent (trademark: Alchrom 713, made of Nihon Parkerizing Co.) and kept at a temperature of 50° C. for 60 seconds, and then rinsed with city water for 30 seconds, to form an undercoat layer on the base body.

(2) Formation of organic hydrophilic coating layer

The under-coated aluminum alloy base body of the heat exchanger was coated with an organic hydrophilic coating layer by the procedures as described in each of the following examples and comparative examples.

In all of the examples and comparative examples, the contents of components in the compositions for the coating layer are based on solid mass.

Example 1

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 6.0 g/liter |
| Citric acid (First grade) | 6.0 g/liter |
| Water | Balance |

Example 2

The undercoated aluminum alloy base body for the heat exchanger was immersed in a coating liquid having the composition shown below at room temperature for 30 seconds, and the resultant coating liquid layer on the base body surface was dried and heat treated in an electric oven kept at a temperature of 180° C. for 30 minutes, to form a hydrophilic coating layer.

| Coating liquid composition | |
|---|---|
| Glycerylated chitosan (degree of glycerylation: 1.1) | 3.0 g/liter |
| Citric acid (First grade) | 5.0 g/liter |
| Polyethylene glycol (Molecular weight: about 20.000) | 3.0 g/liter |
| Surfactant (Nonylphenyl-(EO)$_{20}$ addition product) | 1.0 g/liter |
| Water | Balance |

Example 3

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liguid composition | |
|---|---|
| Chitosan | 3.0 g/liter |
| Mellitic acid | 4.0 g/liter |
| Polyacrylamide (MW: about 25.000) | 4.0 g/liter |
| 1,2-benzoisothiazoline-3-one | 1.0 g/liter |
| Water | Balance |

Comparative Example 1

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Hydroxypropylcellulose | 6.0 g/liter |
| Citric acid (First grade) | 6.0 g/liter |
| Water | Balance |

Comparative Example 2

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Chitosan | 6.0 g/liter |
| Phosphoric acid (First grade) | 6.0 g/liter |
| Water | Balance |

Comparative Example 3

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 1.0 g/liter |
| Mellitic acid (First grade) | 1.0 g/liter |
| Hydroxypropylcellulose | 10.0 g/liter |
| Water | Balance |

Comparative Example 4

The undercoated aluminum alloy base body for the heat exchanger was immersed in a coating liquid having the composition shown below at room temperature for 30 seconds, and the resultant coating liquid layer on the base body surface was dried and heat treated in an electric oven at a temperature of 145° C. for 30 minutes, to form a hydrophilic coating layer.

| Coating liquid composition | |
|---|---|
| Glycerylated chitosan (degree of glycerylation: 1.3) | 6.0 g/liter |
| Acetic acid (First grade) | 6.0 g/liter |
| Water | Balance |

Comparative Example 5

The same aluminum alloy base body of heat exchanger as used in Example 1 was coated by the following procedures as disclosed in Japanese Unexamined Patent Publication No. 9-14889, Example 1, to form a coating layer.

A base body made of an aluminum alloy for a heat exchanger was immersed in an aqueous solution of 30 g/liter of a weak alkaline degreasing agent (trademark: Finecleaner 315, made by Nihon Parkerizing Co.) kept at a temperature of 60° C. for 50 seconds to remove staining material such as greasy materials on the surface, and rinsed with city water for 30 seconds. Then, the cleaned base body was immersed in an aqueous treating liquid containing 72 g/liter of chromic acid-chromating agent (trademark: Alchrom 713, made by Nihon Parkerizing Co.) and kept at a temperature of 50° C. for 60 seconds, and rinsed with city water for 30 seconds, to form a first protecting layer on the base body surface.

The first coating layer surface of the base body was immersed in an aqueous treating liquid containing 100 parts by mass of polyacrylamide (made by Daiichi Kogyoseiyaku K.K.), 110 parts by mass of polyvinylsulfonic acid (made by Nihon Shokubai K.K.), 40 parts by mass of a nonionic water-soluble nylon having polyethyleneoxide groups in molecular skeleton thereof (made by Toray K.K.) and 10 parts by mass of a cross-linking agent consisting of chromium biphosphate, at a temperature of 25° C. for 30 seconds, and the treating liquid layer on the base body surface was subjected to an air blow treatment, and then dried and heat treated in a hot air circulation dryer at a temperature of 140° C. for 20 minutes, to form a second protecting layer.

Tests and Evaluations

The heat exchangers obtained in each of Examples 1 to 3 and Comparative Examples 1 to 5 were subjected to the following tests and evaluations.

(1) Absorption or impregnation of odorous components of tobacco

Figure 2:
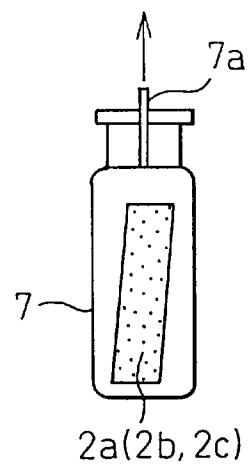
FIG. 2 is an explanatory front view of a GC-MS analyser for evaporized substances.

A testing apparatus shown in FIGS. 1 and 2 for absorption or impregnation of odorous components of tobacco was employed.

As shown in FIG. 1, the testing apparatus has a bell-shaped glass 1 container for containing therein specimens 2a, 2b, and 2c, a smoking cylinder 5 containing therein a cigarette 4 and having an outlet 5a connected to the bell-shaped container 1 through a conduit 1a and an inlet 5b, and a flow meter 3 connected to the inlet 5b of the smoking cylinder 5 through a conduit 3a, and a fresh air-supply conduit 6 connected to the smoking cylinder 5.

Generally, one or more specimens are contained in the bell-shaped container 1, and air is blown into the smoking cylinder 5 at a predetermined flow rate through the conduit 6 and flow meter 3, conduit 3a and inlet 5b, to smoke the cigarette 4. The resultant smoke containing odorous components of tobacco is blown into the container 1 through the outlet 5a and conduit 1a. The odorous components are absorbed by or impregnated in the specimen, and the remaining smoke is removed from the container through an outlet 1b.

The specimen is placed in a GC-MS analyzer as shown in FIG. 2, and an amount of evaporated substance from the specimen is measured by GC-MS analysis.

In this test, coated fins 2a of Examples 1 to 3, coated fins 2b of Comparative Examples 1 to 4 and a coated fin 2c of Comparative Example 5, in total 8 coated fins, were placed in the bell-shaped container, and exposed to tobacco smoke, in the manner as described above, until the cigarette was used up. Each of the specimens 2a, 2b and 2c was placed in a GC-MO analyzer 7 having an opening 7a as shown in FIG. 2, and subjected to GC-MO analysis. The odorous component-absorption or impregnation of each specimen was represented by the amount of the substance evaporated from the specimen. Also, the amount of the substance evaporated from specimen 2c (Comparative Example 5) was represented as 1.0, as standard, and the evaporation amounts of other specimens 2a and 2b were represented by values relative to that of the specimen 2c. The results are shown in Table 1.

(2) Initial hydrophilicity

The contact angle of each specimen (coated fin) with water was measured by using a FACE contact angle meter (Model CA-P, made by Kyowa Kaimenkagaku K.K.). The results are shown in Table 1.

(3) Durability of hydrophilicity

Each specimen (coated fin) was immersed in a water stream at room temperature for 72 hours, and then the contact angle of each specimen with water was measured by using the above-mentioned contact angle meter. The results are shown in Table 1.

TABLE 1

| | Item | | | |
|---|---|---|---|---|
| | | | Contact angle with water (degrees) | |
| Example No. | Total solid content of components (A) and (B) in coating layer (% by solid mass) | Absorption (or impregnation) of odorous components of tobacco | Initial | After duration treatment |
| Example | | | | |
| 1 | 100.0 | 0.41 | 7 | 21 |
| 2 | 66.7 | 0.55 | 5 | 17 |
| 3 | 58.3 | 0.76 | 9 | 25 |
| Comparative Example | | | | |
| 1 | — | 1.38 | 32 | 41 |
| 2 | — | 0.95 | 7 | 68 |
| 3 | 16.7 | 1.07 | 14 | 43 |
| 4 | — | 0.93 | 4 | 62 |
| 5 | — | 1.00(*) | 6 | 20 |

Note: (*) Standard

When the absorption or impregnation of the odorous components of tobacco in the coated fin of Comparative Example 5 according to a conventional art is represented as 1.0, the odorous component absorptions of the coated fins according to the present invention were 0.41 in Example 1, 0.55 in Example 2 and 0.76 in Example 4. In other words, the coated heat exchangers of the present invention had a high resistance to absorption or impregnation of the odorous components of tobacco and exhibited high initial hydrophilicity and high durability of hydrophilicity.

Compared with Examples 1 to 3 according to the present invention, in Comparative Example 1, the coating layer contained no component (A) and exhibited a high absorption of tobacco odorous components of 1.38, which is higher than that of Comparative Example 5, and low hydrophilicity.

In Comparative Example 2, the coating layer contained no component (B) and was soluble in water. Thus, while the resistance to absorption of tobacco odorous components was higher than that of Comparative Example 5, the durability of hydrophilicity of the coated heat exchanger was very poor.

In Comparative Example 3, the total content of the components (A) and (B) was less than 20% by mass, based on the total mass of the coating layer, and the resistance of the coating layer to the absorption of tobacco odorous components was low.

In Comparative Example 4, the carboxylic compound in component (B) had only one carboxyl group per molecule thereof, and the properties of the resultant coating layer were similar to those of Comparative Example 2.

Comparative Example 5 was carried out to provide a conventional coated heat exchanger as a standard.

As is clear from the above description, the aluminum alloy heat exchanger according to the present invention, in which the surface of the base body is coated with a specific coating layer, exhibits a significantly reduced absorption of odorous substances, for example, odorous components of tobacco, and high hydrophilicity and high durability of hydrophilicity.

What is claimed is:

1. An aluminum alloy heat exchange resistive to impregnation of tobacco odor comprising a base body of an aluminum alloy heat exchanger and an organic hydrophilic coating layer formed on at least a portion of the surface of the heat exchanger base body, wherein, the organic hydrophilic coating layer comprises;
a component (A) comprising at least one glycerylated chitosan, and
a component (B) comprising at least one carboxylic compound having three or more carboxyl groups per molecule thereof, and
the component (A) and the component (B) are present in a total solid amount of 20% by mass or more, based on the total amount by mass of the organic hydrophilic coating layer; and
the component (A) is reacted with the component (B) to thereby cross-link the glycerylated chitosan molecules through the tri- or more carboxylic compound to provide a water resistant cross-linked molecular network structure in the coating layer.

2. The aluminum alloy heat-exchanger resistive to impregnation of tobacco odor as claimed in claim 1, wherein the carboxylic compound for the component (B) is selected from citric acid, mellitic acid, trimellitic acid, trimesic acid, phromellitic acid, naphthalenetetracarboxylic acid, butanetricarboxylic acid, butanetetracarboxylic acid, cyclohexanetetracarboxylic acid, and hexanetricarboxylic acid.

3. The aluminum alloy heat-exchanger resistive to impregnation of tobacco odor as claimed in claim 1, wherein the component (A) and the component (B) are present in a solid mass ratio (A)/(B) of 3:1 to 1:3.

* * * * *

UNITED STATES PATENT AND TRADEMARK OFFICE
CERTIFICATE OF CORRECTION

PATENT NO. : 6,689,481 B2
DATED : February 10, 2004
INVENTOR(S) : Kazunari Hamamura et al.

It is certified that error appears in the above-identified patent and that said Letters Patent is hereby corrected as shown below:

Column 9,
Line 32, "exchange" should be -- exchanger --

Column 10,
Line 27, "and" should be -- or --

Signed and Sealed this

Thirty-first Day of August, 2004

JON W. DUDAS
*Director of the United States Patent and Trademark Office*